Patented June 3, 1941

2,244,512

UNITED STATES PATENT OFFICE 2,244,512

PREPARATION OF ALIPHATIC-AROMATIC SULPHONATES

Robert Louis Brandt, New York, N. Y., assignor to Colgate-Palmolive-Peet Company, Jersey City, N. J., a corporation of Delaware No Drawing. Application March 4, 1939, Serial No. 259,792

18 Claims. (Cl. 260—505)

This invention relates to the preparation of certain improved organic sulphonates and more particularly to the preparation of aliphatic substituted aromatic sulphonates while dissolved in a solvent comprising sulphur dioxide.

Among the many classes of organic sulphonates, it has been found that long-chain aliphatic substituted aromatic sulphonic acds are especially desirable for many purposes because of their stability and unusually high wetting, washing, penetrating, solubilizing, and emulsifying efficiency. Numerous patents have been issued on the preparation of compositions employing various members of ths class.

In spite of the fact that many of the substances possess properties not equaled by any of the other organic detergents, their commercial production entails a great many difficulties which not only cause the formation of materials of inferior quality as to color, odor, purity, uniformity, general appearance and efficiency, but which also make the cost of production of these materials so high that their sale competitively with the ordinary soaps and other organic sulphonates is materially impaired.

The preferred aliphatic substituted aromatic compounds to be sulphonated as well as the resulting sulphonates are high molecular weight compounds and hence it is very difficult to cause the raw materials to react at all and even more difficult to obtain substantial yields or any uniformity of products. If heat is used to speed the reaction and to render the molecule more mobile, some increase of reactivity is observed, but many side reactions also may occur and impure, non-uniform products of inferior color and odor result. Polymerization, oxidation, charring, decomposition, improper substitution, and other difficultly controllable and generally undesirable reactions may take place. The viscosity or plasticity of the reaction mass is so high that mixing is practically impossible, hence the special equipment necessary as well as the great amount of energy required to effect mixing often renders the cost of manufacture prohibitive. The improper mixing results in localized over-heating and over-reaction in various parts of the reaction mass and substantially no change in others. Cooling, direct or indirect, is likewise not effective because of the high viscosity of the mass.

This applicant has now discovered that it is possible to commercially prepare uniform aliphatic substituted aromatic sulphonates of good odor, color, purity and other desirable properties on an economical basis by conducting the reactions, particularly the sulphonation reaction, in a solvent comprising liquid sulphur dioxide.

Liquid sulphur dioxide in such solvent compositions serves several functions in the preparation of these substances which functions are not obtainable with any other organic or inorganic liquid.

Liquid sulphur dioxide is a more universal solvent for the reactants and products in reactions of this type. It is a very good solvent for sulphonating agents without materially altering their identity or operation. Other solvents, such as short-chain olefinic compounds, which do dissolve a sulphonating agent, such as sulphur trioxide, react with the agent to change its identity, for example, forming carbyl sulphates. Furthermore, if the selected liquid does dissolve the sulphonating agent, it often does not dissolve the materials to be treated. On the other hand, a solvent for the organic constituents is generally not a solvent for the sulphonating agent or it reacts therewith. If the solvent does not hold all the constituents in solution during the reaction, a two-phase mixture would occur with possible resulting non-uniformity of product.

Liquid sulphur dioxide is unusual in that it is generally a solvent for the aliphatic substituted aromatic compounds as well as for the mixture of aromatic compounds and aliphatic compounds used in preparing said aliphatic substituted aromatic compounds. It is also a solvent for the metal halide catalysts and for the sulphonating agents used to prepare the sulphonic acid products.

Because of the solvent action of the liquid sulphur dioxide, a single phase reaction takes place; furthermore the viscosity of the mass may be varied at will so that through mixing a high degree of turbulence may be imparted to the solution. Thus, temperature control, either direct or indirect, is easily effected.

Liquid sulphur dioxide, because of its low boiling point, is very effective as a refrigerant. A portion of the liquid may be evaporated to absorb the heat of vaporization thereof from the reaction mixture and thus effectively to refrigerate it. The normal boiling point of this solvent is nearer to the optimum reaction temperature than most of the generally used organic liquids, and its low freezing point is also of value in working at sub-atmospheric temperatures.

Another feature of liquid sulphur dioxide which is of major importance is the fact that it affects the rate of reaction of the various constituents. It has been reported in the literature that liquid sulphur dioxide appears to form loose addition products with certain of the reagents, and this, in all probability, alters their relative reactivity. This solvolytic property of liquid sulphur dioxide for this purpose is unique.

The low boiling point of the liquid sulphur dioxide renders it a relatively simple matter to remove the excess solvent from the final product.

The liquid sulphur dioxide serves another novel purpose by reason of the fact that it has a low solubility in dilute sulphuric acid. The reaction mass containing the excess liquid sulphur dioxide may be diluted with water to stop the reaction and to cause the mixture to separate into several layers; in the case of two layers, one comprising the aqueous layer of sulphuric acid and organic derivatives thereof, and the other comprising the liquid sulphur dioxide and water-insoluble organic compounds. By control of the amount of water added, even three layers may be formed; a lower layer of dilute sulphuric acid, a middle layer of sulphonic-sulphuric acids, and an upper layer of a solution of liquid sulphur dioxide and unreacted organic compounds. Without the liquid sulphur dioxide present, there is a tendency to emulsify the water-insoluble products into the aqueous layer.

Liquid sulphur dioxide is chemically stable, non-inflammable, and has highly desirable thermal and heat transfer properties. These properties add to general ease of handling at low temperatures and give it advantages over all previously employed solvents.

The preparation of these compounds is varied but in general it covers the substitution of an aliphatic radical in an aromatic nucleus and the sulphonation of the substituted aromatic compound. The reactions may be conducted simultaneously or in the two stages indicated.

The substitution of the aromatic compound by the aliphatic radical is usually carried out by the Friedel-Crafts reaction modified generally by one of the important features of this invention of conducting the reaction in a solvent usually comprising liquid sulphur dioxide. Catalysts for this reaction are employed, among which are the acid-reacting metal halides including aluminum chloride, boron fluoride, and the chlorides of iron, zinc, antimony, boron, tin, titanium, indium, as well as the bromides and other halides of these metals and mixtures thereof; activated earths including floridin, "Tonsil," fuller's earth; sulphuric acid and its acid derivatives including oleum and chlorsulphonic acid and others hereinafter given; and various mixtures thereof. With the sulphuric derivatives, the steps of aliphatic substitution and sulphonation may be simultaneously conducted. The sulphuric acid derivatives may be used for the sulphonation step in a solvent comprising liquid sulphur dioxide, after the alkylation or acylation has been conducted in other solvents and/or with other catalysts.

Examples of the aromatic compounds which may be used alone or in any desired combination include benzene, toluene, xylene, cumene, cymene, ethyl-benzene, naphthalene, diphenyl, acenaphthene, phenanthrene, anthracene, methyl-naphthalene, ethyl-naphthalene, tetra-hydronaphthalene, triphenylmethane, diphenyl methane, fluorene, styrene, indene, coumarone, solvent naphthas and selective solvent extracts or fractions thereof from coal distillation, Edeleanu or other solvent extract of mineral oils containing aromatic constituents, benzyl chloride, phenanthrone, acetophenone, diphenylketone, diphenyloxide, veratrole, benzyl alcohol, phenols, alkylol phenols, hydroquinone, and resorcinol, as well as other agents which function similarly to aromatic compounds such as furfural, kojic acid and cyclopentadienes. It is also possible to employ the various halogen derivatives of these materials.

The aliphatic compounds which may be employed for reacting with the aromatic compounds include aliphatic halides, olefinic compounds and aliphatic alcohols, these compounds may have one or more operative groups so that mono- or poly-aromatic substitution takes place. Likewise, the aromatic compound may be substituted by one or more of the same or different aliphatic compounds. Although all aliphatic compounds of the above classes will operate, it is preferred to employ the long-chain (6 carbon atoms or more) aliphatic compounds. The olefines which may be used alone or in combination include hexene, heptene, octene, nonene, decene (di-isoamylene), undecene, and so forth, through tetradecene, hexadecene, octadecene, cerotene and higher olefines, as well as the cyclic olefines such as cyclohexene. The source of the olefines is immaterial and includes olefines prepared by cracking petroleum; polymerizing shorter chain olefines such as isobutylene, isoamylene, etc.; catalytic dehydrogenation of saturated petroleum or other hydrocarbons; halogenation of aliphatic hydrocarbons and dehydrohalogenation; and those prepared by dehydrating one or more long-chain alcohols (branched or straight chain), including hexyl, heptyl, octyl, nonyl, decyl, dodecyl, myristyl, cetyl, octadecyl, oleyl, montanyl, carnaubyl, octadecandiol, ceryl, cyclohexyl, methyl cyclohexyl, and melissyl alcohols, and mixtures containing these alcohols such as those prepared by hydrogenating coconut oil, cocoa butter, soy bean oil, tallow, cottonseed oil, olive oil, castor oil, palm oil, fish oil, whale oil, tall oil, carnauba wax, Japan wax, Chinese wax, montan wax, ceresine, ozocerite, stearone, laurone, and the like. The liberation of water from the alcohol to form olefines may be effected by the action of chemical agents or according to catalytic methods, for example, by means of concentrated phosphoric acid or activated carbon impregnated with phosphoric acid, phosphorous pentoxide, aluminum oxide, bauxite and agents acting in the same manner. The above listed alcohols may be used directly in the process if sufficient dehydrating agents, e. g. of the type of oleum, acetic anhydride, and like agents, are present.

Suitable raw material for the preparation of olefines by the above procedures are the liquid to solid paraffin hydrocarbons of any origin such as those obtained from mineral oils, petroleum jelly, liquid petrolatum, or wax, or by distillation of tar, mineral or schist or oils; the hydrocarbons which may be obtained by the cracking, reduction or hydrogenation of mineral oils, tars, cracking or polymerization residues, or the oxides of carbon; olefinic products of high molecular weight prepared by polymerization by means of peroxides, acids, acid-reacting metal halides, light, or electric currents; as well as from organic materials of vegetable origin, ceresine, ozocerite, lignite wax, brown coal, tar wax, mineral oils such as spindle, and other lubricating oils and their fractions.

It is possible to effect the dehydrogenation by cracking the raw material or by introducing halogen and then treating at an elevated temperature with formation of the hydro-halogen acid. The freeing of the halogen is effected by means of alkali (caustic soda), aluminum oxide, bauxite, zinc chloride, barium chloride and similar agents.

It is also possible to use the halogenated hydrocarbons (preferably containing at least six carbon atoms) directly. These compounds may be prepared according to any known procedure from aliphatic compounds or mixtures composed in the major portion of such materials. Suitable starting materials include the liquid, semi-solid or solid, saturated or unsaturated, hydrocarbons of any origin, having a boiling point preferably above 100° C., such as those obtained by fractionating mineral oils as petroleum, tar, coal tar or lignite oils; petrolatum, paraffin wax and the like.

Halogenation of these hydrocarbons may be carried out at ordinary or raised temperatures, the action of light or of halogenation catalysts such as antimony pentachloride, phosphorous pentachloride, ferric chloride, ferric iodide, and so forth, frequently having a favorable effect on the reaction. Unsaturated hydrocarbons may be hydrohalogenated to form the corresponding saturated halogen derivatives. As a general rule in the preparation of mono-aryl substituted aliphatic compounds, it is advantageous to regulate the proportion of halogen used in such a way that for each gram molecule of hydrocarbon there will be one gram atom or less of the halogen, the non-halogenated part of the hydrocarbon serving as diluent in the final condensation. It is also possible before halogenation to mix the aliphatic and aromatic compounds used as initial reactants, the aliphatic fractions and/or the aromatic fractions being halogenated in accordance with the operating conditions. Individual aliphatic halides may be employed as, for example, dodecyl chloride, octyl bromide, octadecyl chloride, tetradecyl chloride (branch and straight chained) and related substances.

For aliphatic compounds having more than one aromatic substitution, the aliphatic compound should have more than one functional radical of the group comprising halides, olefine linkages and hydroxy groups. For example, octadecenyl chloride, octadec-diene, octadecenyl alcohol, octadecandiol, dichlor-octadecane, dichlorododecane and the like. If it is desired to prepare compounds having halogen constituents remaining in the final products, it is preferred not to employ a catalyst of the type of acid-reacting metal halides. For example, sulphuric acid derivatives serve as catalysts for the alkylation of aromatics with halogen-containing olefines or halogen containing alcohols without removing the halogen from the alkyl chain.

Other substituted aliphatic compounds may be used such as halogenated fatty acids, hydroxy-fatty acids, and mono and poly-olefinic fatty acids including oleic acid, monochloropalmitic acid, linoleic acid, dichlorostearic acid, and ricinoleic acid; ethers and esters such as lauroyl glycerine monochlorhydrin, tetraethylene glycol, ethyl oleate, ethyl ether of octadecenyl alcohol, dodecyl ester of chloracetic acid; ketonic compounds such as dichlorlaurone; and the like.

It is also possible to prepare acylated derivatives of the aromatic compound. For example, an acid halide of a carboxylic acid such as benzoyl chloride, stearoyl chloride, palmitoyl chloride, lauroyl chloride, myristoyl chloride, caproyl chloride, and capryllic chloride may be reacted in liquid sulphur dioxide and/or other solvents with the aromatic compounds listed above to form the acylated derivative thereof.

The sulphonation, alkylation and acylation reactions are conducted in a solvent, and it is at times advantageous to use a mixture of solvents to improve the solubility of some of the organic constituents. Among such solvents, in addition to liquid sulphur dioxide, are benzol and other aromatic compounds; methane, ethane, pentane, butane, propane, and other alkanes; ethylene, and other olefines; petroleum ether; dioxane, diethyl ether and other ethers; carbon disulphide; carbon dioxide; carbon tetrachloride, chloroform, dichlorethane, trichlorethylene, dichlorethylene, dichloro-difluormethane (Freon) and other halogenated hydrocarbons; and various mixtures thereof.

It is sometimes desirable to conduct the aliphatic substitution of the aromatic compound in other solvents than liquid sulphur dioxide and then to sulphonate in the presence of liquid sulphur dioxide, with or without the solvent used in the first step. In such cases, the liquid sulphur dioxide may be added to the aliphatic substituted aromatic material directly or along with the sulphonating agent, or both. In preparing the solutions, it is often advisable to dissolve the aromatic constituent along with or prior to the aliphatic constituent, in view of the general superior solubility of the aromatic constituents. The order of introducing the agents may be varied more or less. For example, the sulphonating agent or solution thereof may be added to a solution of the aliphatic substituted aromatic compounds. On the other hand, the aliphatic substituted aromatic material, per se or in solution, may be added to a solution of the sulphonating agent. Solutions of both may also be simultaneously brought into confluence, which is advantageous in a continuous process.

Cooling in the varied reactions may be obtained by evaporating a portion but not all of the solvent used in conducting these reactions. By suitable selection of the proper solvent combination, pressure control, and the like, it is possible to obtain practically any desired temperature. In addition, refrigeration may be obtained by indirect cooling or by means of other inert refrigerants such as non-gaseous carbon dioxide added directly to the reacting mixture. These refrigerants may be separated and recovered by fractional distillation and compression.

The aliphatic substituted aromatic product may be sulphonated simultaneously with its formation, or subsequently, either directly or after previous elimination of the non-condensed aliphatic or aromatic constituents. After elimination of the catalyst it is possible, if desired, to purify the condensation product by distillation or the like.

The sulphonation treatment is conducted while the materials are substantially in solution in a solvent comprising liquid sulphur dioxide by means of concentrated sulphuric acid, fuming sulphuric acid, oleum, sulphonyl chloride, sulphur dioxide and chlorine gas, sulphur trioxide, acetyl sulphuric acid, bromsulphonic acid, chlorsulphonic acid, or their mixtures, with or without sulphonation assistants, as for example, agents capable of combining with water, such as acetic anhydride, glacial acetic acid, acetyl chloride, propionic anhydride, butyric anhydride, phophorous pentoxide, phosphoric oxychloride, boric anhydride, and the like. Liquid sulphur dioxide and/or other solvents such as dioxane may be added to the sulphonating agent before the reaction. The temperature used varies within wide limits preferably between −15° C. and +15° C. depending on the strength of the sulphonating agents, the solvent combination employed, and the nature of the material to be sulphonated. It is possible to introduce one or more sulphonic acid groups depending on the desired properties of the final products.

The sulphonation reaction may be stopped by the addition of water to the reaction mass, thus reducing the acid concentration. This addition of water generates heat which may be used to advantage in removing the liquid sulphur dioxide or other solvent. On the other hand, the addition of water may be made under suitable conditions of cooling and/or pressure so that the liquid sulphur dioxide is not vaporised and two or three immiscible layers are formed, depending on the degree of dilution with water. The aqueous layer will contain sulphuric acid or derivatives thereof, and the upper or liquid sulphur dioxide layer will contain the non-sulphonated material. In a two-layer system the sulphonic acids will be in the aqueous layer, whereas in the three-layer system the sulphonic acids will be in an intermediate layer. These layers may be separated and the liquid sulphur dioxide solution separated into its constituents or re-used in the sulphonation step. The aqueous solution of sulphuric and sulphonic acids from either source of separation may be extracted with a relatively concentrated solution of sodium chloride also containing sodium acid sulphate. This step removes a substantial proportion of the excess sulphuric acid from the organic sulphonic acids. The organic sulphonic acids, with or without the excess sulphuric acid, may be neutralized with organic or inorganic bases, as for example soda ash, caustic soda, caustic potash, ammonia, methyl amines, ethyl amines, butyl amines, mono-, di-, or tri-ethanolamine, mono-, di-, or tri-glycerol amine, pyridine, piperidine, lime, and the like. Other salts which may be formed include those of magnesium, mercury, lithium, and so on. It is also possible to prepare inorganic salt free material by preparing the calcium salt, thus causing a precipitation of a substantial portion of the sulphuric acid as insoluble calcium sulphate which may be separated from the soluble calcium salt of the organic sulphonic acids.

Another way of preparing the inorganic salt free material is to extract the solid salts or aqueous solutions of mixtures of the soluble salts with a solvent such as ethyl alcohol, dioxane, acetone, Cellosolve, butyl alcohol, and the like. The individual salts may be prepared by salt interchange between concentrated solutions of soluble inorganic salts of the cation desired with solutions of the organic sulphonic acid salts on hand.

The following examples are given for the purpose of illustrating the present invention, but are not intended to be limiting on the scope thereof:

*Example I*

360 parts of dodecyl chloride are dissolved in a mixture of 200 parts benzene and 1500 parts of liquid sulphur dioxide, held in a jacketed autoclave provided with a stirring device. 200 parts of anhydrous aluminum chloride are added, with stirring, in small portions over a period of about 10 minutes. The mixture is stirred for 4 hours. To this reaction product is then slowly added, with vigorous agitation, about 500 parts of 20% oleum dissolved in 500 parts of liquid sulphur dioxide. Temperature control is maintained by circulating a cooling fluid through the jacket of the autoclave. The temperature is maintained at not greater than +5° C. for about an hour, meanwhile continuing the agitation. The reaction mixture is now slowly added to ice-water. The heat generated by the dilution of the acid mixture is dissipated largely by the evaporation of the liquid sulphur dioxide, which in turn prevents the temperature from increasing to an undesirable degree (not higher than 25° C.) while the acid is still in a relatively concentrated state. When the mixture is diluted with about twice its volume of water, it is neutralized with caustic soda, digested to break down unstable products, and then washed with gasoline to remove unsulphonated material. The product is finally dried on soap-drying rolls.

*Example II*

64 parts of naphthalene and 70 parts of di-iso-amylene are dissolved in 700 parts of liquid sulphur dioxide. 74 parts of anhydrous aluminum chloride are added in portions to the solution during 10 minutes. The mixture is stirred for 2 hours, and then there is added thereto a solution comprising 115 parts of sulphur trioxide in 135 parts of liquid sulphur dioxide. Agitation is continued for another 20 minutes, meanwhile holding the temperature below 10° C. The reaction mixture is then slowly added to ice-water, with agitation. The heat of dilution vaporizes a large portion of the liquid sulphur dioxide. The last parts of sulphur dioxide are removed by boiling the acid solution for a brief period. The product is washed with ethyl ether, neutralized with ammonia, and extracted with isopropyl alcohol to yield an ammonium salt of the aliphatic substituted aromatic sulphonic acid (free of ammonium sulphate). The product is dried by spraying in the presence of an excess of ammonia gas to prevent fire hazard.

*Example III*

160 parts of diphenyl are dissolved in 500 parts of dichlorethane. To this mixture is then added 200 parts of a fraction boiling between about 150° C. and 200° C. of a liquid sulphur dioxide extract of a cracked Pennsylvania (aliphatic) mineral oil distillate. 125 parts of 96% sulphuric acid are slowly added with continuous stirring. The mixture is heated to about 50°–65° C. for about 3 hours, meanwhile continuing the stirring. 250 parts of 65% oleum dissolved in 500 parts of liquid sulphur dioxide are then added to the cooled reaction mixture and stirred for 1 hour at +5° C. Sufficient ice-water is then slowly added, with some external cooling, meanwhile maintaining the pressure on the system, thus causing the mixture to separate into three layers. The solvent layer and the lower weak sulphuric acid layer are separately removed. The middle layer of sulphonic acids is washed twice with liquid sulphur dioxide to extract substantially all of the remaining sulphonated material. The sulphonic acid layer, after removal from the liquid sulphur dioxide wash layers, is heated to expel the remaining sulphur dioxide.

The sulphonic acid solution is then washed with a concentrated solution of sodium chloride containing sodium acid sulphate to remove substantially all the sulphuric acid dissolved therein. The remaining aqueous solution of alkyl substituted diphenyl sulphonic acids is neutralized with soda ash. The aqueous solution thereof containing some free sodium carbonate is spray-dried in a spray-tower with hot gases, the sodium carbonate serving to prevent fire in the spray-tower.

The above examples merely show a few of the specific embodiments of the broad invention given in detail hereinbefore.

The products obtained in accordance with the present invention, either as acids or salts, have good wetting, solubilizing, deterging, sudsing, water-softening, dispersing, emulsifying, penetrating, and equalizing properties. Since their calcium and magnesium salts are water-soluble, they operate efficiently in hard as well as in soft water. They are good wetting agents both in hot and cold baths, and function effectively in the presence of large quantities of inorganic salts.

Although the new materials possess unusual deterging, sudsing, and water-softening properties by themselves, their action may be augmented by the addition of any of the common auxiliary agents used in soap and detergent compositions. Suitable addition agents are other emulsifying agents including soaps, rosinates, long-chain alcohol sulphates, monoglyceride monosulphates, sulphonated mineral oil extracts, turkey red oil, lecithin, glycerolamines, diethanolamine and triethanolamine and their soaps; alkaline soap builders such as sodium carbonate, sodium silicate, sodium phosphate, and borax; coloring matter such as dyes, lakes, pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, glycol, tetrahydrofurfuryl alcohol, phenol, cyclohexanol, water, tetralin, pine oil, mineral oil, mineral oil extracts, and naphtha; perfumes and deodorants; fats, oils, fatty acids, monoglycerides, vitamins, waxes, gums, or glue; resins; germicides such as phenol, mercury chloride, phenyl mercury nitrate, phenyl mercury chloride, methyl ester of hydroxy benzoic acid, and mercuric chloride; styptics such as aluminum chloride and cephalin; any of the common water-soluble salts such as sodium sulphate, chloride, acetate, bicarbonate, sesquicarbonate, hypochlorite, thiosulphate, hydrosulphite, and hyposulphate, or the corresponding ammonium and potassium salts thereof. The type of addition agent to be used, of course, will depend on the ultimate use of the new composition.

The water-soluble, water-softening phosphorous compounds of the type of tetraphosphoric, pyrophosphoric or hexametaphosphoric acid and their alkali metal, ammonia, and amine salts or alkyl esters may also be added to these compositions.

The final composition, with or without one or more addition agents, may be formed into beads, flakes, bars, chips, crystals, powders, solutions, liquid or plastic emulsions, pastes, creams, salves, or any other forms desired. The ingredients may be mixed by any of the common methods such as grinding, stirring, kneading, crutching, fusing, and drying, by rolls, spray or otherwise, of mixed solutions.

Although the specific examples given hereinbefore indicate a batch procedure, it is possible to conduct the entire process in a continuous manner. For example, the aromatic and olefinic compounds may be mixed with a solvent and then brought into confluence with a liquid sulphur dioxide solution of a sulphuric acid derivative sufficient to at least cause alkylation, meanwhile continuously flowing the materials through heat-exchangers. At several points in the flow, additional sulphuric acid derivative solution may be added to complete alkylation and/or sulphonation of the material. Water may be added and sulphur dioxide removed by heat and release of pressure. The neutralization may be conducted by continuously bringing solutions of the acid or acids into confluence with concentrated alkali. The various washing steps indicated hereinbefore may be conducted by countercurrent flow through suitable towers at the appropriate point or points in the process. Addition agents, preferably in the form of their solutions, may be continuously introduced into the sulphonate solution either before, during or after the neutralization. The solution of material, in a continuous manner, may be raised to an elevated temperature to destroy any unstable compounds and may be concentrated by flash-distillation, which also removes volatile impurities in the product along with the steam.

The compositions may be used in various ways such as washing compositions for wood, metal, stone, glass, brick, masonry and painted surfaces; insecticides; cements; abrasive compositions; antiseptics; water-softeners; deodorants and disinfectants; water paints and polishes; sizes, glues and adhesives such as shellac and casein compositions; liquid, solid and paste tooth and mouth detergents; laundry detergents and other textile agents including laundry blueing, bleaching, dyeing, softening, lubricating, and discharging compositions; depilatories; dust preventing compositions; fire extinguishing compositions; drain, lavatory and radiator cleaners; anti-freezing, anti-fogging, and anti-corrosion compositions; wood impregnants; electrolytic baths; etching compositions; cosmetics, shaving preparations, shampoos and hair-wave lotions; tanning agents and fat-liquors for leather; photographic solutions; paint, stain and grease removers; dry-cleaning compositions; rug cleaners; petroleum de-emulsifying compositions; fruit washing; fat splitting; preparation of dyes and dye intermediates; preparation of germicidal agents; preparation of resins and plasticizers such as the aliphatic substituted phenol-aldehyde (formaldehyde), aliphatic substituted aryl sulphonamid, and aliphatic substituted aryl sulphonamid-aldehyde (formaldehyde) type; and any compositions requiring wetting, washing, emulsifying, penetrating, solubilizing, dispersing and like agents.

As many apparently widely different embodiments of this invention may be made without departing from the spirit and scope thereof, it is to be understood that the applicant does not limit himself to the specific proportions or embodiments thereof except as defined in the following claims.

I claim:

1. A process of preparing detergent aromatic sulphonic acid derivatives which comprises reacting an aromatic compound with an aliphatic compound containing at least six carbon atoms and having at least one radical of the group consisting of olefine, halogen and hydroxy radicals and with a sulphonating agent, at least the sulphonation reaction being conducted while the organic material is dissolved in a solvent comprising liquid sulphur dioxide as the major constituent, and neutralizing the alkylated aromatic sulphonic acid product.

2. A process of preparing detergent aromatic sulphonic acid derivatives which comprises reacting in solution an aromatic compound with an aliphatic compound containing at least six carbon atoms and with a sulphonating agent, at least the sulphonation reaction being conducted while the organic material is dissolved in a solvent comprising liquid sulphur dioxide as the major constituent, and neutralizing the aliphatic-aromatic sulphonic acid product.

3. A process of preparing aromatic sulphonic acid derivatives which comprises simultaneously reacting an aromatic compound with an aliphatic compound having at least six carbon atoms, and with a sulphonating agent, the reactions being conducted while the organic material is dissolved in a solvent comprising liquid sulphur dioxide as the major constituent, and neutralizing the aliphatic-aromatic sulphonic acid product.

4. A process of preparing detergent aromatic sulphonic acid derivatives which comprises reacting an aromatic compound with an aliphatic compound containing at least six carbon atoms in the presence of a sulphuric acid derivative catalyst, and with a sulphonating agent, at least the sulphonation reaction being conducted while the organic material is dissolved with a solvent comprising liquid sulphur dioxide as the major constituent, and neutralizing the aliphatic-aromatic sulphonic acid product.

5. A process of preparing aromatic sulphonic acid derivatives which comprises reacting an aromatic compound with an aliphatic compound containing at least six carbon atoms, in the presence of a sulphuric acid derivative catalyst, and with a sulphonating agent, the reactions being conducted while the organic material is dissolved in a solvent comprising liquid sulphur dioxide as the major constituent, and neutralizing the aliphatic-aromatic sulphonic acid product.

6. A process of preparing detergent aromatic sulphonic acid derivatives which comprises reacting an aromatic compound with an aliphatic compound containing at least six carbon atoms in the presence of an acid-reacting metal halide catalyst, and then with a sulphonating agent, at least the sulphonation reaction being conducted while the organic material is dissolved in a solvent comprising liquid sulphur dioxide as the major constituent, and neutralizing the aliphatic-aromatic sulphonic acid product.

7. A process of preparing aromatic sulphonic acid derivatives which comprises reacting an aromatic compound with an aliphatic compound containing at least six carbon atoms, in the presence of an acid-reacting metal halide catalyst, and then with a sulphonating agent, the reactions being conducted while the organic material is dissolved in a solvent comprising liquid sulphur dioxide as the major constituent, and neutralizing the aliphatic-aromatic sulphonic acid product.

8. The process of preparing aromatic sulphonic acid derivatives which comprises sulphonating an aliphatic substituted aromatic compound in which the aliphatic radical contains at least six carbon atoms while said compound is dissolved in a solvent comprising liquid sulphur dioxide as the major constituent, and neutralizing the aliphatic-aromatic sulphonic acid product.

9. The process of preparing detergent aromatic sulphonic acid derivatives which comprises sulphonating an aliphatic substituted aromatic compound in which the aliphatic radical contains a least six carbon atoms while said compound is dissolved in a solvent consisting of liquid sulphur dioxide and a stable low boiling point organic liquid, and neutralizing the aliphatic-aromatic sulphonic acid product.

10. The process of preparing detergent aromatic sulphonic acid derivatives which comprises reacting an aromatic compound with an olefinic compound containing at least six carbon atoms, and with a sulphonating agent, the sulphonation reaction being conducted while the organic material is dissolved in a solvent comprising liquid sulphur dioxide as the major constituent, and neutralizing the aliphatic-aromatic sulphonic acid product.

11. The process of preparing detergent aromatic sulphonic acid derivatives which comprises reacting an aromatic compound with a halogen-containing aliphatic compound containing at least six carbon atoms and with a sulphonating agent, the sulphonation reaction being conducted while the organic material is dissolved in a solvent comprising liquid sulphur dioxide as the major constituent, and neutralizing the aliphatic aromatic sulphonic acid product.

12. The process of preparing detergent aromatic sulphonic acid derivatives which comprises reacting an aromatic compound with an aliphatic hydroxy compound containing at least six carbon atoms and with a sulphonating agent, the sulphonation reaction being conducted while the organic material is dissolved in a solvent comprising liquid sulphur dioxide as the major constituent, and neutralizing the aliphatic-aromatic sulphonic acid product.

13. The process of preparing detergent aromatic sulphonic acid derivatives which comprises reacting an aromatic hydrocarbon with an aliphatic halide containing at least six carbon atoms, in the presence of acid-reacting metal halide catalyst, and then with a sulphonating agent, at least the sulphonation reaction being conducted while the organic material is dissolved in a solvent comprising liquid sulphur dioxide as the major constituent, and neutralizing the aliphatic-aromatic sulphonic acid product.

14. A process of preparing aromatic sulphonic acid derivatives which comprises reacting an aromatic hydrocarbon with an aliphatic hydroxy compound containing at least six carbon atoms, in the presence of sulphuric acid derivative catalyst, and with a sulphonating agent, the reactions being conducted while the organic material is dissolved in a solvent comprising liquid sulphur dioxide as the major constituent, and neutralizing the aliphatic-aromatic sulphonic acid product.

15. A process of preparing aromatic sulphonic acid derivatives which comprises reacting an aromatic hydrocarbon with an olefine containing at least six carbon atoms, in the presence of a sulphuric acid derivative catalyst and a solvent, and then with a sulphonating agent, the sulphonation reaction being conducted while the organic material is dissolved in a mixture of the solvent used in the alkylation step and liquid sulphur dioxide as the major constituent, and neutralizing the aliphatic-aromatic sulphonic acid product.

16. The process of preparing aromatic sulphonic acid derivatives which comprises reacting an aromatic compound with an olefinic compound containing at least six carbon atoms, in the presence of an acid-reacting metal halide and a solvent, and then with a sulphonating agent, while the organic material is dissolved in a solvent comprising liquid sulphur dioxide as the major constituent, and neutralizing the aliphatic-aromatic sulphonic acid product.

17. The process of preparing aromatic sulphonic acid derivatives which comprises reacting diphenyl with a long-chain olefinic hydrocarbon containing at least six carbon atoms, in the presence of a concentrated sulphuric acid and a solvent and then with a more concentrated sulphuric acid derivative while the diphenyl derivative is dissolved in a solvent comprising liquid sulphur dioxide as the major portion constituent, and neutralizing the aliphatic-aromatic sulphonic acid product.

18. The continuous process of preparing aromatic sulphonic acid derivatives which comprises continuously mixing an aromatic compound with an aliphatic compound having at least six carbon atoms, and a solvent, continuously adding an alkylation catalyst to the mixture, after a suitable waiting period continuously adding a sulphonating agent and liquid sulphur dioxide to the reaction mixture, after a suitable waiting period continuously adding water to the sulphonated product, continuously removing liquid sulphur dioxide from said dilute acid product, continuously washing the dilute acid product with a concentrated salt solution in a countercurrent manner, and continuously bringing the washed sulphonic acids into confluence with a concentrated alkali, suitably arranging the various cooling and heating steps to take advantage of heat interchange.

ROBERT LOUIS BRANDT.